(12) United States Patent
Ajisaka (10) Patent No.: US 11,001,122 B2
(45) Date of Patent: May 11, 2021

(54) VEHICLE POWER UNIT TEMPERATURE REGULATION SYSTEM

(71) Applicant: TOYOTA JIDOSHA KABUSHIKI KAISHA, Toyota (JP)

(72) Inventor: Satoshi Ajisaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 16/184,362

(22) Filed: Nov. 8, 2018

(65) Prior Publication Data

US 2019/0152287 A1 May 23, 2019

(30) Foreign Application Priority Data

Nov. 20, 2017 (JP) .............................. JP2017-223062

(51) Int. Cl.
*B60K 1/00* (2006.01)
*B60H 1/00* (2006.01)
(Continued)

(52) U.S. Cl.
CPC ..... *B60H 1/00278* (2013.01); *B60H 1/00392* (2013.01); *B60H 1/00428* (2013.01);
(Continued)

(58) Field of Classification Search
CPC ............ B60H 1/00278; B60H 1/00392; B60H 1/00428; B60H 1/00885; B60H 1/00492; B60H 1/323; B60H 1/32331; B60H 1/00271; B60H 1/004; B60H 2001/3291; B60H 2001/00957; B60H 2001/3266;
(Continued)

(56) References Cited

U.S. PATENT DOCUMENTS 5,490,572 A * 2/1996 Tajiri ...................... B60L 58/21
180/65.1
5,549,153 A * 8/1996 Baruschke .............. B60L 58/26
165/42
(Continued)

FOREIGN PATENT DOCUMENTS

JP H08-149611 A 6/1996
JP H11-208257 A 8/1999
(Continued)

*Primary Examiner* — James M Dolak
(74) *Attorney, Agent, or Firm* — Oliff PLC (57) ABSTRACT

A vehicle temperature regulation system includes: a power unit including a motor driven by a supply of electrical power from a battery to cause wheels to rotate; a first cooling unit including a first heat exchanger disposed at a vehicle front side of the power unit, and a first circulation path that allows refrigerant to circulate between the power unit and the first heat exchanger to perform heat exchange; a second cooling unit including a second heat exchanger disposed at a vehicle rear side of the power unit, an air conditioning unit, a compressor, and a second circulation path that allows refrigerant to circulate between the second heat exchanger, the air conditioning unit, and the compressor to perform heat exchange; and a duct that interconnects the air conditioning unit and the battery and through which cool air or warm air is supplied from the air conditioning unit to the battery.

6 Claims, 4 Drawing Sheets

(51) Int. Cl.
  *B60H 1/32* (2006.01)
  *B60H 1/22* (2006.01)
(52) U.S. Cl.
  CPC ..... *B60H 1/00492* (2013.01); *B60H 1/00885* (2013.01); *B60H 1/22* (2013.01); *B60H 1/323* (2013.01); *B60H 1/32331* (2019.05); *B60H 2001/003* (2013.01); *B60H 2001/00957* (2013.01); *B60H 2001/3266* (2013.01); *B60H 2001/3291* (2013.01)
(58) Field of Classification Search
  CPC .. B60H 2001/003; B60K 11/00; B60K 11/02; B60K 11/04; B60K 11/06; B60K 11/08; B60K 2001/003; B60K 2001/005; B60K 2001/006; B60K 2001/008; B60R 16/00; B60R 16/02; B60R 16/04
  See application file for complete search history.

(56) References Cited

U.S. PATENT DOCUMENTS

| | | | | |
|---|---|---|---|---|
| 6,323,613 | B1* | 11/2001 | Hara | B60L 15/20 318/471 |
| 6,394,210 | B2* | 5/2002 | Matsuda | B60K 6/52 180/68.1 |
| 6,408,633 | B1* | 6/2002 | Carr | F24F 1/0007 62/99 |
| 6,978,628 | B2* | 12/2005 | Honda | B60H 1/004 62/134 |
| 7,013,659 | B2* | 3/2006 | Yoshida | H01M 10/63 62/186 |
| 7,096,683 | B2* | 8/2006 | Smith | B60L 50/52 62/200 |
| 7,789,176 | B2* | 9/2010 | Zhou | B60H 1/32281 180/65.1 |
| 8,336,319 | B2* | 12/2012 | Johnston | B60L 1/003 62/79 |
| 8,561,420 | B2* | 10/2013 | Kakizaki | B60H 1/3227 62/279 |
| 8,752,660 | B2* | 6/2014 | Ajisaka | B60K 11/06 180/68.1 |
| 8,973,386 | B2* | 3/2015 | Favaretto | B60L 3/0046 62/243 |
| 9,309,982 | B2* | 4/2016 | Akiyama | B60L 3/0069 |
| 9,650,940 | B2* | 5/2017 | Kakehashi | B60H 1/32284 |
| 9,878,591 | B2* | 1/2018 | Taniguchi | B60H 1/00278 |
| 10,259,286 | B2* | 4/2019 | Janier | B60K 11/02 |
| 10,340,563 | B2* | 7/2019 | Blatchley | H01M 10/663 |
| 10,486,526 | B2* | 11/2019 | Ajisaka | B60K 11/04 |
| 10,814,698 | B2* | 10/2020 | Ishizeki | B60H 1/3216 |
| 10,843,522 | B2* | 11/2020 | Minamiura | B60H 1/00885 |
| 2009/0071178 | A1* | 3/2009 | Major | B60L 1/003 62/239 |
| 2012/0159986 | A1* | 6/2012 | Imanishi | B60L 1/003 62/498 |
| 2012/0297809 | A1* | 11/2012 | Carpenter | B60L 50/66 62/244 |
| 2016/0297280 | A1* | 10/2016 | Riederer | F25B 21/02 |
| 2018/0339583 | A1 | 11/2018 | Hirai | |

FOREIGN PATENT DOCUMENTS

| | | |
|---|---|---|
| JP | 2004-098836 A | 4/2004 |
| JP | 2012-156010 A | 8/2012 |
| JP | 2017-047698 A | 3/2017 |

\* cited by examiner

VEHICLE POWER UNIT TEMPERATURE REGULATION SYSTEM

CROSS-REFERENCE TO RELATED APPLICATION

This application is based on and claims priority under 35 USC 119 from Japanese Patent Application No. 2017-223062 filed on Nov. 20, 2017, the disclosure of which is incorporated by reference herein.

BACKGROUND

Technical Field

The present disclosure relates to a vehicle temperature regulation system.

Related Art

Japanese Patent Application Laid-open (JP-A) No. 2012-156010 discloses a battery cooling structure provided with a duct, which guides cool air from an air conditioning system to a battery, and a circulation path, which allows a cooling liquid to circulate therethrough to cool the battery. In this structure, the battery is cooled by both the cool air from the air conditioning system and the cooling liquid.

However, in this structure, a radiator and a capacitor, which are heat exchangers, are disposed next to each other at the vehicle front side or the vehicle rear side of a power unit. Therefore, pipes (flow paths) need to be lengthened in order to cool both the power unit and the battery, and there is room for improvement in regard to raising efficiency.

SUMMARY

In consideration of the circumstances described above, the present disclosure provides a vehicle temperature regulation system that may efficiently regulate the temperature of a power unit and a battery.

One aspect of the disclosure is a vehicle temperature regulation system including: a power unit including a motor that is driven by a supply of electrical power from a battery to cause wheels to rotate; a first cooling unit including a first heat exchanger disposed at a vehicle front side of the power unit, and a first circulation path that allows refrigerant to circulate between the power unit and the first heat exchanger to perform heat exchange; a second cooling unit including a second heat exchanger disposed at a vehicle rear side of the power unit, an air conditioning unit, a compressor, and a second circulation path that allows refrigerant to circulate between the second heat exchanger, the air conditioning unit, and the compressor to perform heat exchange; and a duct that interconnects the air conditioning unit and the battery and through which cool air or warm air is supplied from the air conditioning unit to the battery.

The vehicle temperature regulation system of this aspect includes the first cooling unit and the second cooling unit. The first cooling unit includes the first heat exchanger, which is disposed at the vehicle front side of the power unit, and the first circulation path, which allows refrigerant to circulate between the power unit and the first heat exchanger to perform heat exchange. The second cooling unit includes the second heat exchanger disposed at the vehicle rear side of the power unit, the air conditioning unit, the compressor, and the second circulation path that allows refrigerant to circulate between the second heat exchanger, the air conditioning unit, and the compressor to perform heat exchange. The air conditioning unit and the battery are interconnected by the duct, and cool air or warm air is supplied through the duct from the air conditioning unit to the battery. As a result, the temperature of the battery may be regulated.

Furthermore, by disposing the first heat exchanger at the vehicle front side of the power unit and disposing the second heat exchanger at the vehicle rear side of the power unit to separate the first cooling unit and the second cooling unit, the first circulation path and the second circulation path may each be shortened.

As described above, according to the vehicle temperature regulation system pertaining to the aspect, the temperature of the power unit and the battery may be efficiently regulated.

The aspect may further include: a cooling water storage tank that is disposed between the air conditioning unit and the compressor in the second circulation path, and contains cooling water that is cooled by heat exchange with the refrigerant inside the second circulation path; and a cooling water supply path that supplies the cooling water from the cooling water storage tank to a circulation water flow path that circulates inside the battery.

In this configuration, the cooling water storage tank is disposed between the air conditioning unit and the compressor, and the cooling water inside the cooling water storage tank is cooled by heat exchange with refrigerant inside the second circulation path. The cooling water is supplied from the cooling water storage tank to the cooling water supply path. The cooling water is supplied through the cooling water supply path to the circulation water flow path in a case in which, for example, the temperature of the battery is high, and the circulation water flow path circulates through the inside of the battery, whereby the battery may be cooled.

According to this configuration, the battery may be cooled more effectively.

The aspect may further include: a heating water storage tank that is disposed between the compressor and the second heat exchanger in the second circulation path, and contains heating water that is warmed by heat exchange with the refrigerant inside the second circulation path; and a heating water supply path that supplies the heating water from the heating water storage tank to the circulation water flow path.

In this configuration, the heating water storage tank is disposed between the compressor and the second heat exchanger, and the heating water inside the heating water storage tank is warmed by heat exchange with refrigerant inside the second circulation path. The heating water is supplied from the heating water storage tank to the heating water supply path. The heating water is supplied through the heating water supply path to the circulation water flow path in a case in which, for example, the temperature of the battery is low, and the circulation water flow path circulates through the inside of the battery, whereby the battery may be warmed.

According to this configuration, the battery may be warmed.

The aspect may further include an inverter disposed at a vehicle upper side of the power unit; and a cooling water flow path through which cooling water is circulated between the first heat exchanger and the inverter.

In this configuration, the cooling water flow path through which the cooling water is circulated is provided between the first heat exchanger and the inverter. Therefore, the inverter may be cooled. Furthermore, by disposing the inverter at the vehicle upper side of the power unit, the length of the cooling water flow path may be shortened in comparison to a structure in which the power unit and the inverter are disposed in positions away from each other.

According to this configuration, the inverter may be efficiently cooled.

In the aspect, the air conditioning unit may include a drain that discharges water, and the water is discharged through the drain from the air conditioning unit toward the second heat exchanger.

In this configuration, since water is discharged through the drain from the air conditioning unit toward the second heat exchanger, heat exchange in the second heat exchanger may be promoted.

According to this configuration, the efficiency of heat exchange in the second heat exchanger may be improved.

DETAILED DESCRIPTION

A vehicle temperature regulation system pertaining to an embodiment will be described below with reference to the drawings. It will be noted that arrow FR illustrated in the drawings indicates a vehicle forward direction, arrow UP indicates a vehicle upward direction, and arrow RH indicates a rightward direction in a vehicle width direction. When description is given below simply using the directions of front/rear, upper/lower, and right/left, unless otherwise specified these directions will refer to front/rear in the vehicle front-rear direction, upper/lower in the vehicle vertical direction, and right/left in the vehicle width direction when facing the traveling direction.

Figure 1:
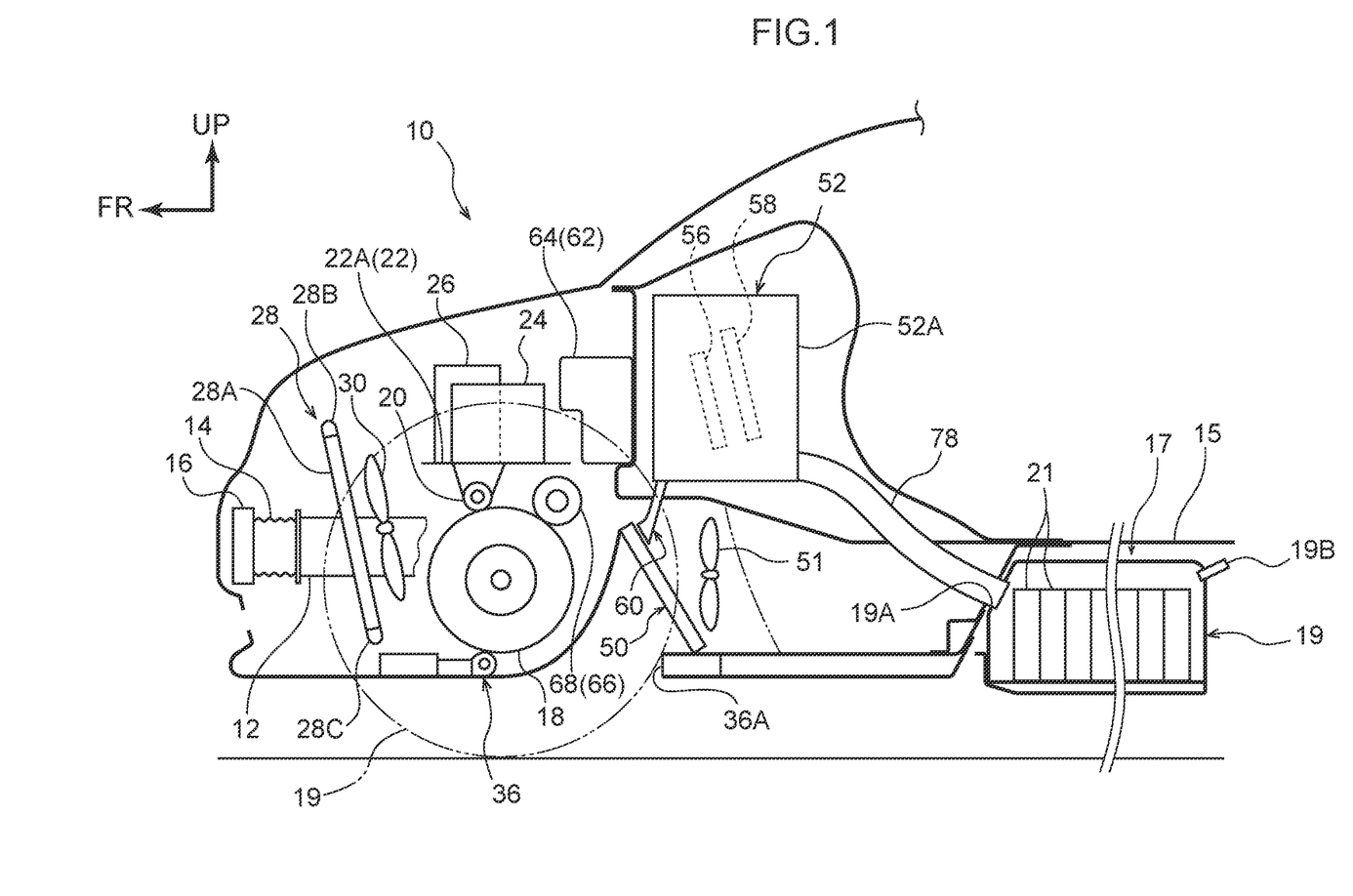
FIG. 1 is a general side view of a vehicle front portion to which a vehicle temperature regulation system pertaining to an embodiment has been applied.

As illustrated in FIG. 1, a front portion of a vehicle 10 to which the vehicle temperature regulation system pertaining to the embodiment has been applied is provided with a right and left pair of front side members 12 that extend in the vehicle front-rear direction (note that FIG. 1 illustrates only the front side member 12 on the right side). Crash boxes 14 are provided at front end portions of the front side members 12, and a bumper reinforcement 16 whose longitudinal direction coincides with the vehicle width direction is provided on front end portions of the crash boxes 14. A shock absorbing material may be additionally provided on the front surface of the bumper reinforcement 16.

A motor 18 is disposed between the right and left pair of front side members 12. The motor 18 is driven by a supply of electrical power from a later-described battery 17, and driving force generated by the motor 18 is transmitted via a gear box (not illustrated in the drawings) and the like to front wheels (wheels) 23. Namely, the front wheels 23 are rotated as a result of the motor 18 being driven. In the present embodiment, a power unit is configured by the motor 18.

Figure 2:
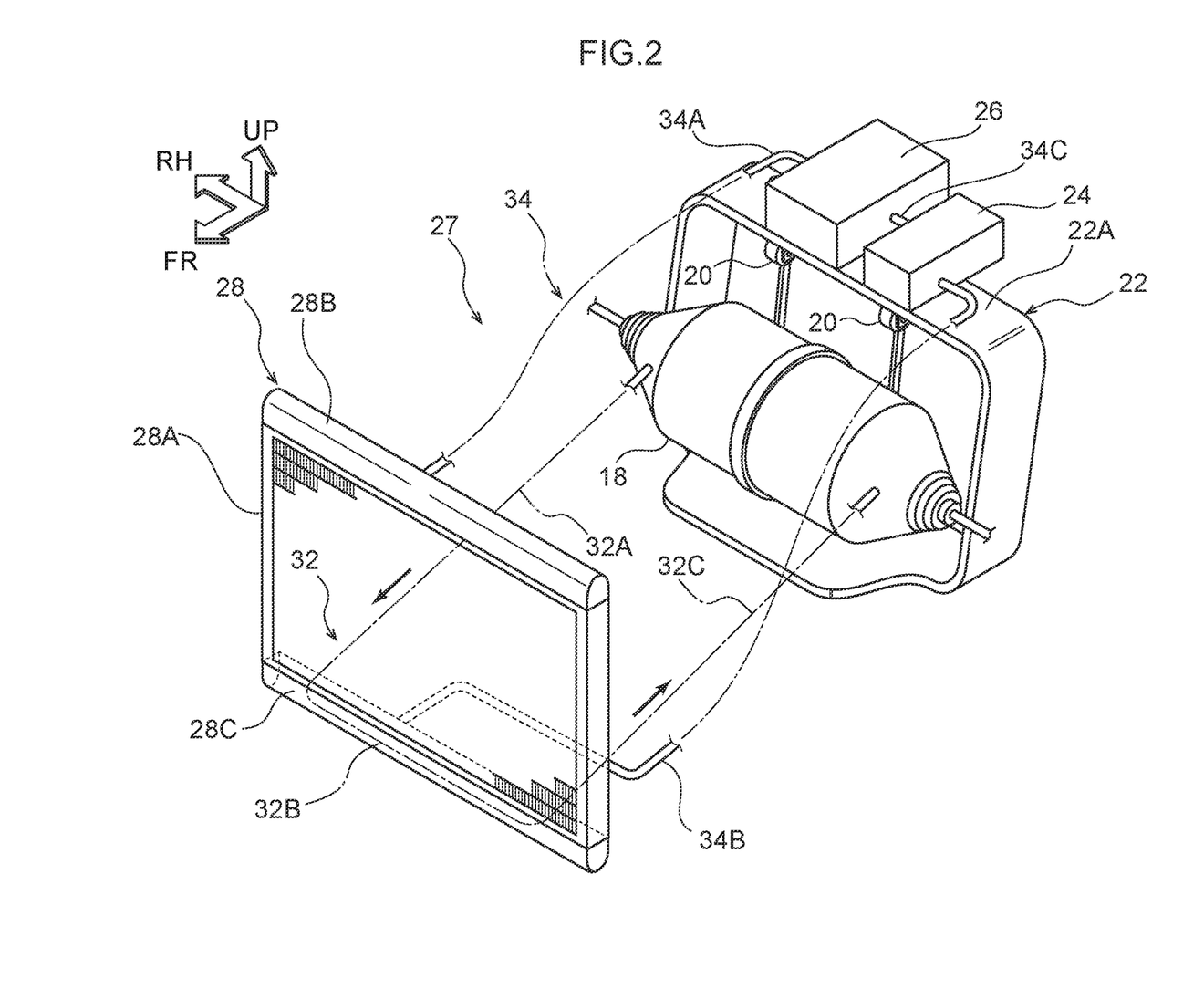
FIG. 2 is an exploded perspective view illustrating a first cooling unit that configures the vehicle temperature regulation system pertaining to the embodiment.

Motor mounts 20 are provided at the vehicle upper side of the motor 18, and the motor 18 is supported by a frame 22 via the motor mounts 20. As illustrated in FIG. 2, the frame 22 is formed substantially in a rectangular frame shape as seen from the vehicle front side, and the motor mounts 20 are secured to the lower surface of an upper wall portion 22A of the frame 22. An inverter 24 and a charger 26 are secured to the upper surface of the upper wall portion 22A of the frame 22. The inverter 24 modulates the electrical power of the battery 17 to generate a voltage applied to the motor 18.

As illustrated in FIG. 1, the battery (battery unit) 17 is disposed below a floor panel 15 that configures a floor surface of the vehicle 10. The battery 17 includes a battery case 19 and battery packs 21. The battery case 19 is formed substantially in a rectangular box shape as seen in a plan view and extends toward the rear portion of the vehicle 10. A connection portion 19A to which a later-described duct 78 is connected is formed on the front end portion of the battery case 19. An outflow portion 19B through which air delivered to the inside of the battery case 19 escapes is formed on the rear end portion of the battery case 19.

Plural battery packs 21 are disposed inside the battery case 19. Electrical power stored in the plural battery packs 21 is supplied via a cable (not illustrated in the drawings) to the motor 18.

A radiator 28 serving as a first heat exchanger is disposed at the vehicle front side of the motor 18. The radiator 28 includes a core 28A, an upper tank 28B provided at the vehicle upper side of the core 28A, and a lower tank 28C provided at the vehicle lower side of the core 28A. The core 28A is formed substantially in a rectangular shape as seen in a front view and is provided with plural tubes through which cooling water travels and heat radiation fins (see FIG. 2). The cooling water is stored in the upper tank 28B and the lower tank 28C. The cooling water that has flowed from the upper tank 28B to the core 28A travels through the core 28A and thereby exchanges heat with cooling air. The cooling water after cooling is stored in the lower tank 28C. A radiator fan 30 is provided at the vehicle rear side of the radiator 28. Cooling air flows from the vehicle front side to the radiator 28 as a result of the radiator fan 30 being rotated.

(First Cooling Unit 27)

As illustrated in FIG. 2, a first cooling unit 27 is configured by the radiator 28 and a first circulation path 32. The first circulation path 32 includes a flow path 32A that extends in the vehicle front-rear direction from one longitudinal direction end portion of the motor 18 to the lower tank 28C of the radiator 28, a flow path 32B that extends in the vehicle width direction through the lower tank 28C, and a flow path 32C that extends from the lower tank 28C to the other longitudinal direction end portion of the motor 18. The first circulation path 32 is configured such that cooling oil flows inside the flow path 32A, the flow path 32B, and the flow path 32C. An oil pump (not illustrated in the drawings) is provided in the first circulation path 32. The cooling oil circulates through the first circulation path 32 as a result of the oil pump being operated, whereby the motor 18 is cooled.

A cooling water flow path 34 through which the cooling water is circulated is provided between the radiator 28 and the inverter 24. Specifically, the cooling water flow path 34 is disposed so as to circulate through the inverter 24, the charger 26, and the radiator 28. The cooling water flow path 34 includes a flow path 34A that extends in the vehicle front-rear direction from the charger 26 to the upper tank 28B of the radiator 28, a flow path 34B that extends in the vehicle front-rear direction from the lower tank 28C to the inverter 24, and a flow path 34C that interconnects the inverter 24 and the charger 26. The cooling water flow path 34 is configured such that the cooling water flows inside the flow path 34A, the flow path 34B, and the flow path 34C. A water pump (not illustrated in the drawings) is provided in the cooling water flow path 34. The cooling water circulates through the cooling water flow path 34 as a result of the water pump being operated, whereby the inverter 24 and the charger 26 are cooled.

As illustrated in FIG. 1, a capacitor 50 serving as a second heat exchanger is provided oat the vehicle rear side of the motor 18. A capacitor fan 51 is provided at the vehicle rear side of the capacitor 50. Cooling air flows from the vehicle front side to the capacitor 50 as a result of the capacitor fan 51 being rotated. In this embodiment, an opening 36A is formed in an under cover 36 that configures a lower surface of the vehicle 10, and the opening 36A is configured to allow the airflow that flows between the vehicle 10 and the road surface to flow through the opening 36A to the capacitor 50.

Figure 3:
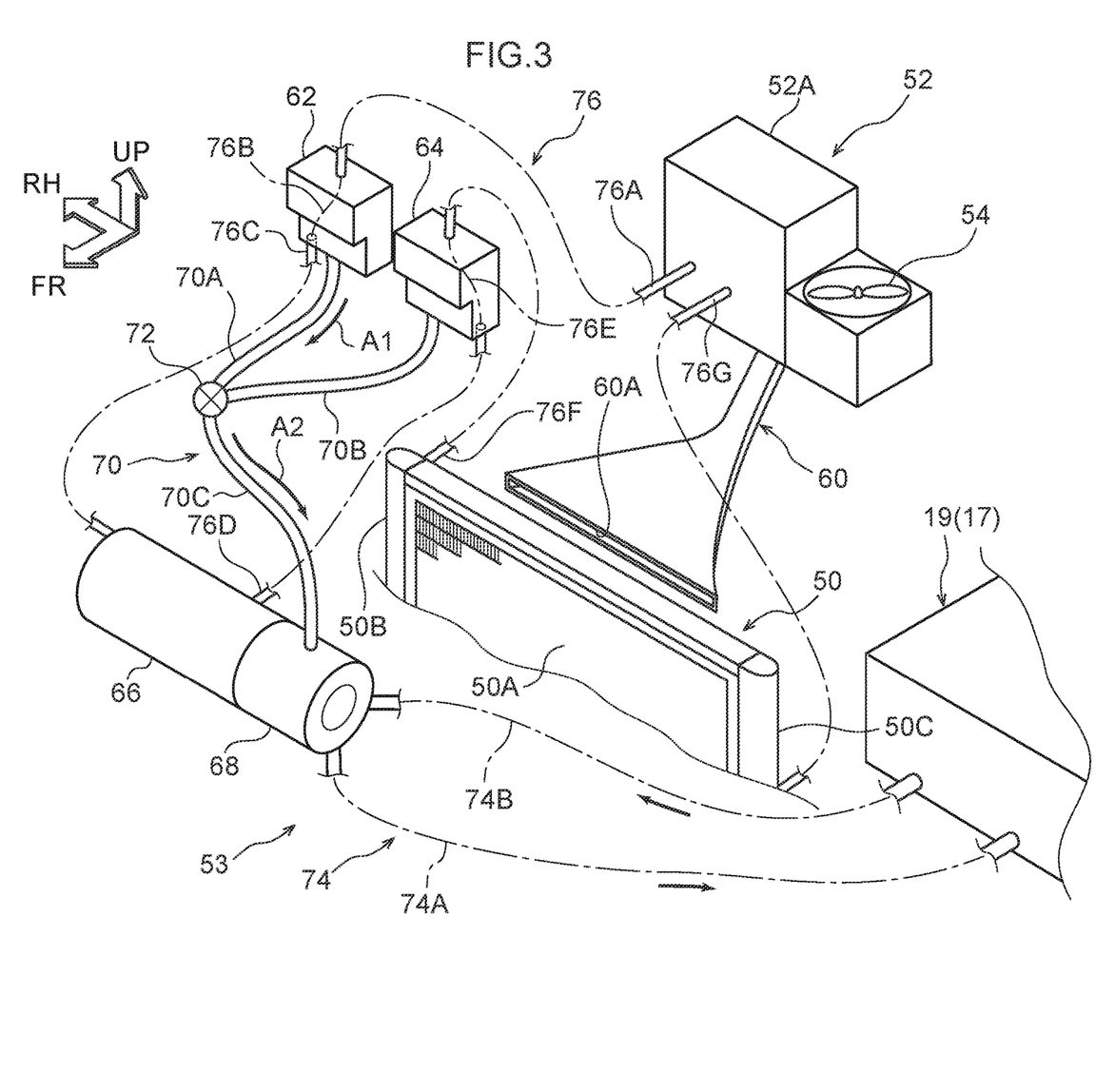
FIG. 3 is an exploded perspective view illustrating a second cooling unit that configures the vehicle temperature regulation system pertaining to the embodiment, and illustrates a state in which a battery is being cooled.

As illustrated in FIG. 3, the capacitor 50 includes a core 50A, a right pipe 50B provided at the vehicle right side of the core 50A, and a left pipe 50C provided at the vehicle left side of the core 50A. The core 50A is formed substantially in a rectangular shape as seen in a front view and is provided with plural tubes through which refrigerant travels and heat radiation fins. The refrigerant flows in the right pipe 50B and the left pipe 50C. The refrigerant flows downward through the core 50A while snaking back and forth between the right pipe 50B and the left pipe 50C and thereby exchanges heat with cooling air.

(Second Cooling Unit 53)

A second cooling unit 53 is configured by the capacitor 50, an air conditioning unit 52, a compressor 66, and a second circulation path 76. The air conditioning unit 52 is equipped with a casing 52A formed substantially in a box shape. An evaporator 56 and a heater core 58 are housed inside the casing 52A (see FIG. 1). The air conditioning unit 52 is provided with a fan 54. The air conditioning unit 52 is configured such that cool air or warm air is delivered from the air conditioning unit 52 as a result of the fan 54 being operated. The air conditioning unit 52 is provided with a supply path for supplying the cool air or the warm air to the cabin.

A drain 60 extends from the lower surface of the air conditioning unit 52. The drain 60 is formed so as to gradually become wider in its width heading toward its distal end, and a discharge opening 60A is formed at the distal end of the drain 60. The discharge opening 60A is positioned above the capacitor 50 in the vehicle vertical direction and, therefore, water generated by the air conditioning unit 52 is discharged through the drain 60 from the discharge opening 60A to the capacitor 50.

The compressor 66 compresses refrigerant at a low temperature and a low pressure to a high temperature and a high pressure, and sends the compressed refrigerant to the capacitor 50. In the embodiment, a water pump 68 is provided integrally with the compressor 66, and the water pump 68 causes water inside a later-described circulation water flow path 74 to circulate.

The second circulation path 76 is a circulation path that allows the refrigerant to circulate between the capacitor 50, the air conditioning unit 52, and the compressor 66 to perform heat exchange. The second circulation path 76 travels through a cooling water storage tank 62 disposed between the air conditioning unit 52 and the compressor 66.

The second circulation path 76 also travels through a heating water storage tank 64 disposed between the compressor 66 and the capacitor 50.

The second circulation path 76 is equipped with a flow path 76A that extends from the air conditioning unit 52 to the cooling water storage tank 62, a flow path 76B that travels through the cooling water storage tank 62, and a flow path 76C that extends from the cooling water storage tank 62 to the compressor 66. The second circulation path 76 is also equipped with a flow path 76D that extends from the compressor 66 to the heating water storage tank 64, a flow path 76E that travels through the heating water storage tank 64, a flow path 76F that extends from the heating water storage tank 64 to the upper portion of the right pipe 50B of the capacitor 50, and a flow path 76G that extends from the lower portion of the left pipe 50C of the capacitor 50 to the air conditioning unit 52.

Changes in the state of the refrigerant that flows through the second circulation path 76 described above will be described. First, the refrigerant flows in a low-temperature and a low-pressure state through the flow path 76A of the second circulation path 76 and reaches the cooling water storage tank 62. The flow path 76B is continuous with the flow path 76A and travels through the cooling water storage tank 62. Therefore, the refrigerant and the cooling water inside the cooling water storage tank 62 exchange heat, whereby the cooling water inside the cooling water storage tank 62 is cooled. The flow path 76C is continuous with the flow path 76B and extends to the compressor 66, and the refrigerant is compressed by the compressor 66.

The refrigerant that has been compressed by the compressor 66 and has reached a high temperature and a high pressure flows through the flow path 76D and reaches the heating water storage tank 64. The flow path 76E is continuous with the flow path 76D and travels through the heating water storage tank 64. Therefore, the refrigerant and heating water inside the heating water storage tank 64 exchange heat, whereby the heating water inside the heating water storage tank 64 is heated (warmed). The flow path 76F is continuous with the flow path 76E and extends to the capacitor 50, and the refrigerant flows into the upper portion of the right pipe 50B of the capacitor 50.

The refrigerant that has flowed into the capacitor 50 is liquefied in the process of traveling through the core 50A, flows through the flow path 76G, and is vaporized by an expansion valve (not illustrated in the drawings). Thereafter, the refrigerant reaches the air conditioning unit 52 in a low-pressure and low-temperature state. A refrigeration cycle is configured as described above.

In this configuration, one end portion of a cooling water supply path 70A is connected to the cooling water storage tank 62, and the other end portion of the cooling water supply path 70A is connected to a valve 72. Furthermore, one end portion of a heating water supply path 70B is connected to the heating water tank 64, and the other end portion of the heating water supply path 70B is connected to the valve 72. The valve 72 and the water pump 68 are connected to each other by a flow path 70C. Therefore, by switching the valve 72, the cooling water is supplied through the cooling water supply path 70A and the flow path 70C from the cooling water storage tank 62 to the water pump 68, or the heating water is supplied through the heating water supply path 70B and the flow path 70C from the heating water storage tank 64 to the water pump 68.

A circulation water flow path 74 through which the cooling water or the heating water is circulated is provided between the water pump 68 and the battery 17. The circulation water flow path 74 includes a flow path 74A, through which the cooling water or the heating water flows from the water pump 68 to the battery 17, and a flow path 74B, through which the cooling water or the heating water flows from the battery 17 to the water pump 68. Furthermore, a flow path (not illustrated in the drawings) is disposed inside the battery 17. The battery packs 21 are cooled as a result of the cooling water flowing from the flow path 74A into the battery 17. The battery packs 21 are heated (warmed) as a result of the heating water flowing from the flow path 74A into the battery 17.

As illustrated in FIG. 1, a duct 78 extends from the air conditioning unit 52 to the battery case 19. The air conditioning unit 52 and the battery case 19 (the battery 17) are interconnected by the duct 78. As a result, cool air or warm air from the air conditioning unit 52 is supplied through the duct 78 to the inside of the battery case 19.

(Operation and Effects)

Next, the operation and effects of the present embodiment will be described.

In the embodiment, the vehicle temperature regulation system is equipped with the first cooling unit 27 and the second cooling unit 53 as described above. As illustrated in FIG. 2, the first cooling unit 27 includes the radiator 28, which is disposed on the vehicle front side of the motor 18 that is a power unit, and the first circulation path 32, which allows refrigerant to circulate between the motor 18 and the radiator 28 to perform heat exchange. As a result, in a case in which the temperature of the motor 18 is high, the refrigerant may be circulated in the first circulation path 32 to lower the temperature of the motor 18. Namely, the temperature of the motor 18 may be regulated.

As illustrated in FIG. 3, the second cooling unit 53 includes the capacitor 50 disposed on the vehicle rear side of the motor 18, the air conditioning unit 52, the compressor 66, and the second circulation path 76 that allows the refrigerant to circulate between the capacitor 50, the air conditioning unit 52, and the compressor 66 to perform heat exchange. Moreover, as illustrated in FIG. 1, the air conditioning unit 52 and the battery case 19 are interconnected by the duct 78, and cool air or warm air is supplied through the duct 78 from the air conditioning unit 52 to the interior of the battery case 19. As a result, in a case in which the temperature of the battery packs 21 is high, cool air may be delivered from the air conditioning unit 52 to the battery 17 to cool the battery packs 21. In a case in which the temperature of the battery packs 21 is low, warm air may be delivered from the air conditioning unit 52 to the battery 17 to warm the battery packs 21. Namely, the temperature of the battery packs 21 (the battery 17) may be regulated. In this way, by disposing the radiator 28 at the vehicle front side of the motor 18 and disposing the capacitor 50 at the vehicle rear side of the motor 18 to separate the first cooling unit 27 and the second cooling unit 53, the first circulation path 32 and the second circulation path 76 may each be shortened. As a result, the temperature of the motor 18 and the battery packs 21 may be efficiently regulated.

Furthermore, in the embodiment, as illustrated in FIG. 3, the cooling water storage tank 62 is disposed between the air conditioning unit 52 and the compressor 66, and the cooling water is supplied from the cooling water storage tank 62 through the cooling water supply path 70A and the flow path 70C to the water pump 68 (see arrows A1 and A2 in FIG. 3). When the water pump 68 operates in a case in which, for example, the temperature of the battery packs 21 is high, the cooling water supplied from the cooling water storage tank 62 may circulate through the circulation water flow path 74 to cool the battery packs 21. Namely, the battery packs 21 may be cooled by both the cool air from the air conditioning unit 52 and the cooling water inside the circulation water flow path 74 that circulates through the battery 17.

Figure 4:
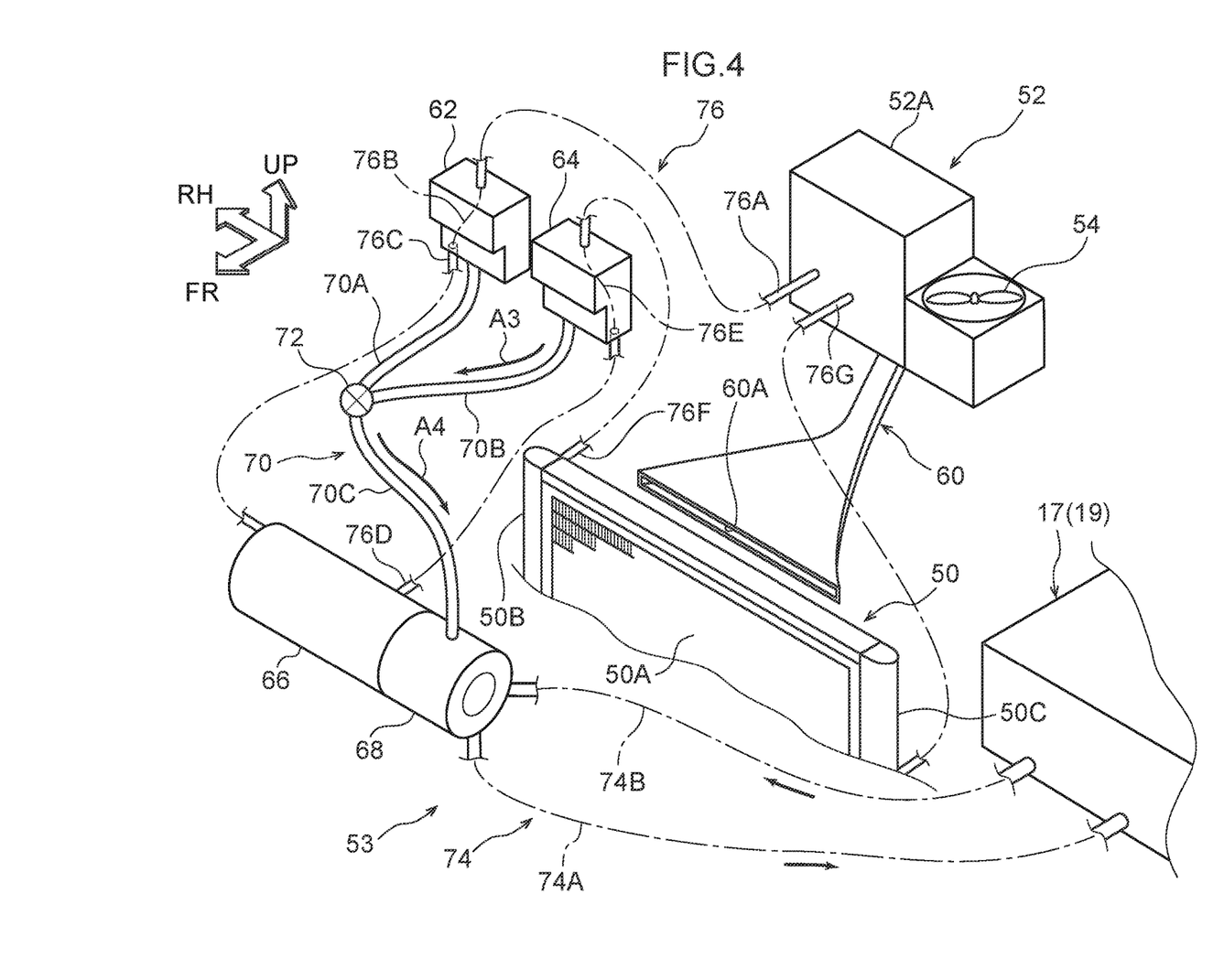
FIG. 4 is an exploded perspective view illustrating the second cooling unit that configures the vehicle temperature regulation system pertaining to the embodiment, and illustrates a state in which the battery is being warmed.

Moreover, in the present embodiment, as illustrated in FIG. 4, the heating water storage tank 64 is disposed between the compressor 66 and the capacitor 50, and the heating water is supplied from the heating water storage tank 64 through the heating water supply path 70B and the flow path 70C to the water pump 68 (see arrows A3 and A4 in FIG. 4). When the water pump 68 operates in a case in which, for example, the temperature of the battery packs 21 is low such as in winter, the heating water supplied from the heating water storage tank 64 may circulate through the circulation water flow path 74 to warm the battery packs 21. Namely, the battery packs 21 may be warmed by both the warm air from the air conditioning unit 52 and the heating water inside the circulation water flow path 74 that circulates through the battery 17. Cooling or warming the battery packs 21 in accordance with the temperature of the battery packs 21 in this way leads to an improvement in the life of the battery packs 21, and travel performance may be excellently maintained particularly in a case in which the vehicle 10 is an electric automobile.

Moreover, in the embodiment, as illustrated in FIG. 2, the cooling water flow path 34 through which the cooling water is circulated between the radiator 28, the inverter 24, and the charger 26 is provided. Therefore, the inverter 24 and the charger 26 may be cooled. Furthermore, by disposing the inverter 24 and the charger 26 on the vehicle upper side of the motor 18, the length of the cooling water flow path may be shortened in comparison to a structure in which the inverter 24 and the charger 26 are disposed in a position away from the motor 18. As a result, the inverter 24 and the charger 26 may be efficiently cooled.

Furthermore, in the embodiment, as illustrated in FIG. 3, the drain 60 is provided in the air conditioning unit 52, and water is drained from the discharge opening 60A of the drain 60 to the capacitor 50, whereby heat exchange in the capacitor 50 may be promoted.

Moreover, in the embodiment, the compressor 66 and the water pump 68 are integrally formed, so in comparison to a structure where the compressor 66 and the water pump 68 are separately prepared, the number of parts may be reduced.

The vehicle temperature regulation system pertaining to the embodiment has been described above, but the vehicle temperature regulation system may be implemented in various ways in a range that does not depart from the spirit of the disclosure. For example, in the embodiment, a configuration equipped with the motor 18 as the power unit has been described, however, the vehicle temperature regulation system is not limited to this and may also be applied to a hybrid vehicle equipped with the motor 18 and an engine. In this case, a separate flow path that allows cooling water to circulate between the radiator 28 and the engine may be set in the configuration of FIG. 2.

What is claimed is:

1. A vehicle temperature regulation system mounted in a vehicle, the vehicle temperature regulation system comprising:
   a power unit including a motor that is driven by a supply of electrical power from a battery to cause wheels of the vehicle to rotate, the power unit having (i) a vehicle front side that faces toward a front side of the vehicle and (ii) a vehicle rear side that faces in an opposite direction of the vehicle front side toward a rear side of the vehicle;

a first cooling unit including a first heat exchanger disposed at the vehicle front side of the power unit, and a first circulation path through which a first refrigerant circulates between the motor of the power unit and the first heat exchanger to perform heat exchange;

a second cooling unit including a second heat exchanger disposed at the vehicle rear side of the power unit, an air conditioning unit, a compressor, and a second circulation path through which a second refrigerant circulates between the second heat exchanger, the air conditioning unit, and the compressor to perform heat exchange; and a duct that interconnects the air conditioning unit and the battery and through which cool air or warm air is supplied from the air conditioning unit to the battery;

wherein the second cooling unit further includes a water pump that is provided integrally with the compressor.

2. The vehicle temperature regulation system according to claim 1, further comprising:

a cooling water storage tank that is disposed between the air conditioning unit and the compressor in the second circulation path, and contains cooling water that is cooled by heat exchange with the second refrigerant inside the second circulation path; and a cooling water supply path that supplies the cooling water from the cooling water storage tank to a circulation water flow path that circulates inside the battery.

3. The vehicle temperature regulation system according to claim 2, further comprising:

a heating water storage tank that is disposed between the compressor and the second heat exchanger in the second circulation path, and contains heating water that is warmed by heat exchange with the second refrigerant inside the second circulation path; and a heating water supply path that supplies the heating water from the heating water storage tank to the circulation water flow path.

4. The vehicle temperature regulation system according to claim 1, further comprising:

an inverter disposed at a vehicle upper side of the power unit, the vehicle upper side facing toward an upper side of the vehicle; and a cooling water flow path through which cooling water is circulated between the first heat exchanger and the inverter.

5. The vehicle temperature regulation system according to claim 1, wherein the air conditioning unit includes a drain that discharges water, and the water is discharged through the drain from the air conditioning unit toward the second heat exchanger.

6. The vehicle temperature regulation system according to claim 3, wherein the water pump couples the cooling water supply path, the heating water supply path, and the circulation water flow path.

* * * * *